United States Patent
Yu

(10) Patent No.: US 10,673,365 B2
(45) Date of Patent: Jun. 2, 2020

(54) MOTOR VECTOR CONTROL METHOD AND DEVICE, AND AIRCRAFT

(71) Applicant: GUANGZHOU XAIRCRAFT TECHNOLOGY CO., LTD, Guangzhou, Guangdong (CN)

(72) Inventor: Jiangtao Yu, Guangdong (CN)

(73) Assignee: GUANGZHOU XAIRCRAFT TECHNOLOGY CO., LTD, Guangzhou, Guangdong (CN)

( * ) Notice: Subject to any disclaimer, the term of this patent is extended or adjusted under 35 U.S.C. 154(b) by 0 days.

(21) Appl. No.: 16/098,571

(22) PCT Filed: Jul. 20, 2017

(86) PCT No.: PCT/CN2017/093739
§ 371 (c)(1),
(2) Date: Nov. 2, 2018

(87) PCT Pub. No.: WO2018/019177
PCT Pub. Date: Feb. 1, 2018

(65) Prior Publication Data
US 2019/0140572 A1    May 9, 2019

(30) Foreign Application Priority Data
Jul. 26, 2016   (CN) .......................... 2016 1 0596989

(51) Int. Cl.
*H02P 21/00* (2016.01)
*H02P 21/22* (2016.01)
*H02P 21/18* (2016.01)
*B64D 31/00* (2006.01)

(52) U.S. Cl.
CPC .............. *H02P 21/22* (2016.02); *H02P 21/00* (2013.01); *H02P 21/0003* (2013.01); *H02P 21/18* (2016.02); *B64D 31/00* (2013.01)

(58) Field of Classification Search
CPC ................................. H02P 21/22; H02P 21/18
USPC ...................................................... 318/400.02
See application file for complete search history.

(56) References Cited

U.S. PATENT DOCUMENTS

2012/0056602 A1    3/2012  Li et al.

FOREIGN PATENT DOCUMENTS

| CN | 103997272 A | 8/2014 |
| CN | 104767451 A | 7/2015 |
| CN | 104901593 A | 9/2015 |
| CN | 105207544 A | 12/2015 |
| CN | 105515479 A | 4/2016 |
| CN | 106870238 A | 6/2017 |

*Primary Examiner* — Erick D Glass
(74) *Attorney, Agent, or Firm* — Shumaker, Loop & Kendrick, LLP; James D. Miller

(57) ABSTRACT

A motor vector control method and device, and an aircraft are provided. The method includes: receiving a Pulse Position Modulation (PPM) signal; acquiring a first given voltage signal of a motor according to the PPM signal; adopting a control manner of giving a d-axis current 0, to acquire a d-axis voltage of the motor; and calculating a q-axis voltage of the motor at the next moment according to the first given voltage signal and the d-axis voltage of the motor, and performing vector control on the motor according to the d-axis voltage of the motor and the q-axis voltage of the motor at the next moment.

16 Claims, 2 Drawing Sheets

US 10,673,365 B2

MOTOR VECTOR CONTROL METHOD AND DEVICE, AND AIRCRAFT

CROSS-REFERENCE TO RELATED PATENT APPLICATIONS

This application is a United States nation phase patent application based on PCT/CN2017/093739 filed on Jul. 20, 2017, which claims the benefit of Chinese Patent Application No. 201610596989.6 filed on Jul. 26, 2016, the entire disclosures of which are hereby incorporated herein by reference.

TECHNICAL FIELD

The present disclosure relates to the technical field of motor control, and in particular to a motor vector control method and device, and an aircraft.

BACKGROUND

Most of motors currently applied to unmanned aerial vehicles are three-phase brushless direct current motors, which are controlled by means of electronic speed regulators.

At present, a motor is controlled by mainly using a six-beat type square wave speed regulator on the market. That is, a speed of the motor is regulated by a duty ratio of converting an input pulse width signal to a Pulse Width Modulation (PWM) signal. However, since six phase changes are present within an electric angle period and a current waveform is a square wave, a large torque pulsation will be generated. The large torque pulsation may cause vibration of a propeller of an aircraft (unmanned aerial vehicle), thereby causing a certain influence on a overall stability of the aircraft, and generating a large noise.

In addition, the motor is also controlled by using a vector control method. That is, a voltage vector is controlled to be continuously output within the electric angle period according to a rotor position, and an output current waveform is a sine wave, so that stable rotor output can be realized. However, if a universal vector control method that generally is a speed closed-loop control manner is directly applied to the aircraft, the following problems will be present.

One, because signals input from a flight controller to an electronic speed regulator are pulse width signals of 0% to 100%, the pulse width signal of 0% and the pulse width signal of 100% respectively correspond to a given lowest rotating speed and highest rotating speed respectively. When the highest rotating speed is set, output may not achieve the highest rotating speed due to gradual voltage reduction of a battery, so as to make the aircraft out of control.

Two, the flight controller will output changing pulse width signals when stabilizing an aircraft attitude. This may cause a rapid change of a given speed. And an output torque will rapidly change according to speed closed-loop control, thereby causing a strong jitter of an aircraft body and making the aircraft unable to stably run.

SUMMARY

At least some embodiments of the present disclosure are provided to partially solve at least one of the technical problems in the related art.

To this end, a first embodiment of the present disclosure is to provide a motor vector control method. The method adopts a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved.

A second embodiment of the present disclosure is to provide a motor vector control device.

A third embodiment of the present disclosure is to provide an aircraft.

In the first embodiment of the present disclosure a motor vector control method is provided, including that: receiving a Pulse Position Modulation (PPM) signal; acquiring a first given voltage signal of a motor according to the PPM signal; adopting a control manner of giving a d-axis current 0 to acquire a d-axis voltage of the motor; and calculating a q-axis voltage of the motor at the next moment according to the first given voltage signal and the d-axis voltage of the motor, and performing vector control on the motor according to the d-axis voltage of the motor and the q-axis voltage of the motor at the next moment.

According to the motor vector control method in the embodiment of the present disclosure, the PPM signal is received, and the first given voltage signal of the motor is acquired according to the PPM signal. Then, the control manner of giving the d-axis current 0 is adopted to acquire the d-axis voltage of the motor, and the q-axis voltage of the motor at the next moment is calculated according to the first given voltage signal and the d-axis voltage of the motor. And finally, vector control is performed on the motor according to the d-axis voltage of the motor and the q-axis voltage of the motor at the next moment. The method adopts a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved.

In an optional embodiment of the present disclosure, acquiring the first given voltage signal of the motor according to the PPM signal includes: acquiring a pulse width of the PPM signal; and acquiring the first given voltage signal according to the pulse width of the PPM signal.

In an optional of the present disclosure, the first given voltage signal is acquired by means of the following formula:

$$V_{ref} = \frac{Duty_{on} - Duty_{start}}{Duty_{max} - Duty_{start}} * V_{ref\,max},$$

$$V_{ref} \in [0, V_{ref\,max}],$$

and $V_{ref}$ is the first given voltage signal, $Duty_{on}$ is a pulse width of a current PPM signal, $Duty_{start}$ is a pulse width of a PPM signal when the motor is started, $Duty_{max}$ is a pulse width of a PPM signal when the motor reaches maximum output, and $V_{ref\,max}$ is a maximum output voltage.

In an optional embodiment of the present disclosure, calculating the q-axis voltage of the motor at the next moment according to the first given voltage signal and the d-axis voltage of the motor includes: calculating a given q-axis voltage of the motor according to the first given voltage signal and the d-axis voltage of the motor; acquiring a q-axis voltage of the motor at the current moment; and calculating the q-axis voltage of the motor at the next moment by means of an acceleration and deceleration curve according to the given q-axis voltage and the q-axis voltage of the motor at the current moment.

In an optional embodiment of the present disclosure, the given q-axis voltage of the motor is calculated by means of the following formula:

$$V_{qref} = \sqrt{V_{ref}^2 - V_d^2},$$

and $V_{qref}$ is the given q-axis voltage of the motor, $V_{ref}$ is the first given voltage signal, and $V_d$ is the d-axis voltage of the motor.

In an optional embodiment of the present disclosure, the acceleration and deceleration curve includes one of: a linear acceleration and deceleration curve, a variable acceleration curve and a sine curve.

In an optional embodiment of the present disclosure, when the acceleration and deceleration curve is the linear acceleration and deceleration curve, the q-axis voltage of the motor at the next moment is calculated by means of the following formula:

$$V_{qnew} = \begin{cases} V_{qref}, & |V_{qref} - V_q| \le m * V_{ref\,max} \\ V_q + m * V_{ref\,max}, & (V_{qref} - V_q) > m * V_{ref\,max} \\ V_q - m * V_{ref\,max}, & (V_q - V_{qref}) > m * V_{ref\,max} \end{cases}$$

and $V_{qnew}$ is the q-axis voltage of the motor at the next moment, $V_{qref}$ is the given q-axis voltage of the motor, $V_q$ is the q-axis voltage of the motor at the current moment, and m is a step length size.

In an optional embodiment of the present disclosure, after the q-axis voltage of the motor at the next moment is calculated, the method may further include that: acquiring a q-axis current of the motor; performing Proportional Integral (PI) regulation and amplitude limitation on the q-axis current of the motor; and performing regulation and amplitude limitation on the q-axis voltage of the motor at the next moment according to the amplitude-limited q-axis current.

In an optional embodiment of the present disclosure, the PI regulation and the amplitude limitation are performed on the q-axis current of the motor by means of the following formula:

$$V_{qlim\,Max} = K_p * [(I_{qmax} - I_q) + K_I \int (I_{qmax} - I_q) dt],$$
$$V_{qlim\,Max} \in [-\sqrt{V_{refmax}^2 - V_d^2}, 0]$$

$$V_{qlim\,Min} = K_p * [(I_{qmin} - I_q) + K_I \int (I_{qmin} - I_q) dt], V_{qlim\,Min} \in [0, \sqrt{V_{refmax}^2 - V_d^2}],$$

and $V_{qlim\,Max}$ is an amplitude-limited q-axis negative amplitude limiting voltage, $V_{qlim\,Min}$ is an amplitude-limited q-axis positive amplitude limiting voltage, $K_p$ and $K_I$ are a proportional gain and an integral gain of PI regulation respectively, $I_{qmax}$ is a maximum q-axis current of the motor, $I_{qmin}$ is a minimum q-axis current of the motor, $I_q$ is the q-axis current of the motor, $V_{ref\,max}$ is a maximum output voltage, and $V_d$ is the d-axis voltage of the motor.

In an optional of the present disclosure, the q-axis voltage of the motor at the next moment is regulated and amplitude-limited by means of the following formula:

$$V_{qz} = V_{qnew} - (V_{qlim\,Max} + V_{qlim\,Min}), V_{qz} \in [-\sqrt{V_{refmax}^2 - V_d^2}, \sqrt{V_{refmax}^2 - V_d^2}],$$

and $V_{qz}$ is an amplitude-limited q-axis voltage of the motor at the next moment, $V_{qnew}$ is the q-axis voltage of the motor at the next moment, $V_{qlim\,Max}$ is an amplitude-limited q-axis negative amplitude limiting voltage, $V_{qlim\,Max}$ is an amplitude-limited q-axis positive amplitude limiting voltage, $V_{ref\,max}$ is a maximum output voltage, and $V_d$ is the d-axis voltage of the motor.

In the second embodiment of the present disclosure, a motor vector control device is provided, includes that: a receiving component, arranged to receive a PPM signal; a voltage giving component, connected with the receiving component, and arranged to acquire a first given voltage signal of a motor according to the PPM signal; and a control component, connected with the voltage giving component, and arranged to adopt a control manner of giving a d-axis current 0 so as to acquire a d-axis voltage of the motor, calculate a q-axis voltage of the motor at the next moment according to the first given voltage signal and the d-axis voltage of the motor, and perform vector control on the motor according to the d-axis voltage of the motor and the q-axis voltage of the motor at the next moment.

According to the motor vector control device in the embodiment of the present disclosure, the receiving component receives the PPM signal, the voltage giving component acquires the first given voltage signal of the motor according to the PPM signal, and the control component adopts the control manner of giving the d-axis current 0 to acquire the d-axis voltage of the motor, calculates the q-axis voltage of the motor at the next moment according to the first given voltage signal and the d-axis voltage of the motor, and performs vector control on the motor according to the d-axis voltage of the motor and the q-axis voltage of the motor at the next moment. The device adopts a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved.

In an optional embodiment of the present disclosure, the voltage giving component is arranged to acquire the first given voltage signal of the motor according to the PPM signal by the following steps: acquiring a pulse width of the PPM signal, and acquiring the first given voltage signal according to the pulse width of the PPM signal.

In an optional embodiment of the present disclosure, the voltage giving component is arranged to acquire the first given voltage signal by means of the following formula:

$$V_{ref} = \frac{Duty_{on} - Duty_{start}}{Duty_{max} - Duty_{start}} * V_{ref\,max},$$

$$V_{ref} \in [0, V_{ref\,max}],$$

and $V_{ref}$ is the first given voltage signal, $Duty_{on}$ is a pulse width of a current PPM signal, $Duty_{start}$ is a pulse width of a PPM signal when the motor is started, $Duty_{max}$ is a pulse width of a PPM signal when the motor reaches maximum output, and $V_{ref\,max}$ is a maximum output voltage.

In an optional embodiment of the present disclosure, the control component includes: a first calculation element, arranged to calculate the given q-axis voltage of the motor according to the first given voltage signal and the d-axis voltage of the motor; and a second calculation element, connected with the first calculation element, and arranged to acquire a q-axis voltage of the motor at the current moment, and calculate the q-axis voltage of the motor at the next moment by means of an acceleration and deceleration curve according to the given q-axis voltage and the q-axis voltage of the motor at the current moment.

In an optional embodiment of the present disclosure, the first calculation element is arranged to calculate the given q-axis voltage of the motor by means of the following formula:

$$V_{qref} = \sqrt{V_{ref}^2 - V_d^2},$$

and $V_{qref}$ is the given q-axis voltage of the motor, $V_{ref}$ is the first given voltage signal, and $V_d$ is the d-axis voltage of the motor.

In an optional embodiment of the present disclosure, the acceleration and deceleration curve includes one of: a linear acceleration and deceleration curve, a variable acceleration curve and a sine curve.

In an optional embodiment of the present disclosure, when the acceleration and deceleration curve is the linear acceleration and deceleration curve, the q-axis voltage of the motor at the next moment is calculated by means of the following formula:

$$V_{qnew} = \begin{cases} V_{qref}, & |V_{qref} - V_q| \le m * V_{ref\,max} \\ V_q + m * V_{ref\,max}, & (V_{qref} - V_q) > m * V_{ref\,max} \\ V_q - m * V_{ref\,max}, & (V_q - V_{qref}) > m * V_{ref\,max} \end{cases}$$

and $V_{qnew}$ is the q-axis voltage of the motor at the next moment, $V_{qref}$ is the given q-axis voltage of the motor, $V_q$ is the q-axis voltage of the motor at the current moment, and m is a step length size.

In an optional embodiment of the present disclosure, the control component may further include: a current acquisition element, arranged to acquire a q-axis current of the motor; a first processing element, connected with the current acquisition element, and arranged to perform PI regulation and amplitude limitation on the q-axis current of the motor; and a second processing element, connected with the first processing element, and arranged to perform regulation and amplitude limitation on the q-axis voltage of the motor at the next moment according to the amplitude-limited q-axis current.

In an optional embodiment of the present disclosure, the first processing element is arranged to perform the PI regulation and the amplitude limitation on the q-axis current of the motor by means of the following formula:

$$V_{qlim\,Max} = K_p * [(I_{qmax} - I_q) + K_I \int (I_{qmax} - I_q) dt],$$
$$V_{qlim\,Max} \in [-\sqrt{V_{refmax}^2 - V_d^2}, 0]$$

$$V_{qlim\,Min} = K_p * [(I_{qmin} - I_q) + K_I \int (I_{qmin} - I_q) dt], V_{qlim\,Min} \in [0, \sqrt{V_{refmax}^2 - V_d^2}],$$

and $V_{qlim\,Max}$ is an amplitude-limited q-axis negative amplitude limiting voltage, $V_{qlim\,Min}$ is an amplitude-limited q-axis positive amplitude limiting voltage, $K_p$ and $K_I$ are a proportional gain and an integral gain of PI regulation respectively, $I_{qmax}$ is a maximum q-axis current of the motor, $I_{qmin}$ is a minimum q-axis current of the motor, $I_q$ is the q-axis current of the motor, $V_{ref\,max}$ is a maximum output voltage, and $V_d$ is the d-axis voltage of the motor.

In an optional embodiment of the present disclosure, the second processing element is arranged to perform regulation and amplitude limitation on the q-axis voltage of the motor at the next moment by means of the following formula:

$$V_{qz} = V_{qnew} - (V_{qlim\,Max} + V_{qlim\,Min}), V_{qz} \in [-\sqrt{V_{refmax}^2 - V_d^2}, \sqrt{V_{refmax}^2 - V_d^2}],$$

and $V_{qz}$ is an amplitude-limited q-axis voltage of the motor at the next moment, $V_{qnew}$ is the q-axis voltage of the motor at the next moment, $V_{qlim\,Max}$ is an amplitude-limited q-axis negative amplitude limiting voltage, $V_{qlim\,Max}$ is an amplitude-limited q-axis positive amplitude limiting voltage, $V_{ref\,max}$ is a maximum output voltage, and $V_d$ is the d-axis voltage of the motor.

Besides, the third embodiment of the present disclosure also provides an aircraft, including the above-mentioned motor vector control device.

The aircraft in at least some of the embodiments of the present disclosure adopts, by means of the above-mentioned motor vector control device, a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved, thereby improving the overall performance of the aircraft.

DETAILED DESCRIPTION

Figure 1:
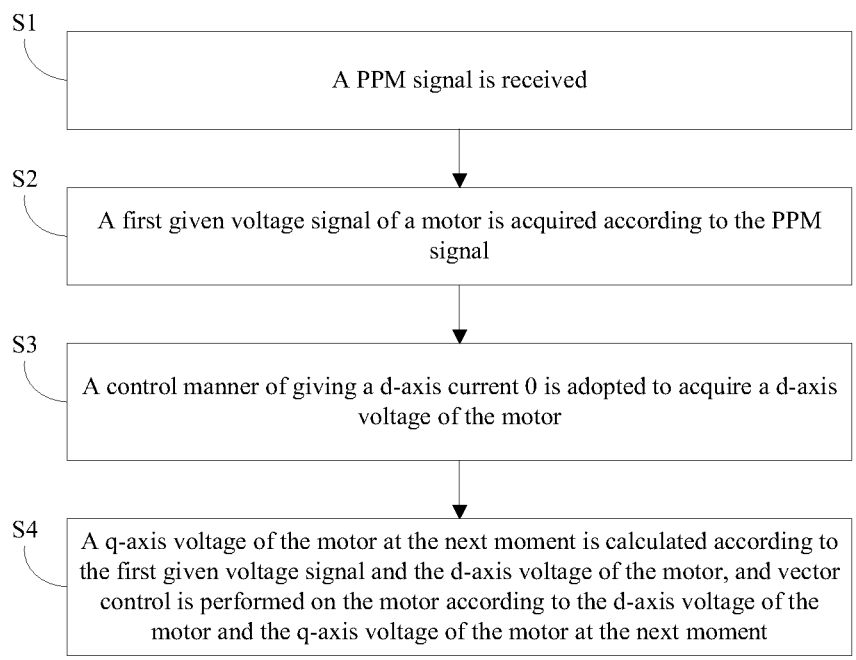
FIG. 1 is a flowchart of a motor vector control method according to an embodiment of the present disclosure.

The embodiments of the present disclosure will be described below in detail. Examples of the embodiments are shown in the drawings, and marks that are identical or similar all the time are representative of identical or similar elements or elements having identical or similar functions. The embodiments described with reference to the drawings below are exemplary, are intended to explain the present disclosure, and cannot be interpreted as limitation to the present disclosure.

For convenience of understanding the embodiments of the present disclosure, terms involved in the embodiments of the present disclosure will be interpreted as follows. A d axis is a direct axis in a motor, and a q axis is a quadrature axis in the motor.

A motor vector control method and device and an aircraft provided in the embodiments of the present disclosure are described below with reference to the drawings.

FIG. 1 is a flowchart of a motor vector control method according to an embodiment of the present disclosure. According to the embodiment as shown in FIG. 1, the motor vector control method includes the steps as follows.

At step S1, a PPM signal is received.

Specifically, in application of an aircraft, the PPM signal may be output from a flight controller to an electronic speed regulator. And the electronic speed regulator controls a motor according to the received PPM signal.

For example, in an exemplary embodiment of the present disclosure, the PPM signal may be a periodic PWM signal of which a positive pulse width is in a range of 1 to 2 ms and the frequency may be in a range of 50 to 400 Hz. It should be noted that in another exemplary embodiment of the present disclosure, the PPM signal may also be given in a manner such as analog voltage or serial port communication.

At step S2, a first given voltage signal of a motor is acquired according to the PPM signal.

In an optional embodiment of the present disclosure, the operation that the first given voltage signal of the motor is acquired according to the PPM signal includes: a pulse width of the PPM signal is acquired; and the first given voltage signal is acquired according to the pulse width of the PPM signal.

Specifically, the first given voltage signal may be acquired by means of the following formula (1):

$$V_{ref} = \frac{Duty_{on} - Duty_{start}}{Duty_{max} - Duty_{start}} * V_{ref\_max}, \quad (1)$$

$$V_{ref} \in [0, V_{ref\_max}].$$

$V_{ref}$ the first given voltage signal. $Duty_{on}$ is a pulse width of a current PPM signal. $Duty_{start}$ is a pulse width of a PPM signal when the motor is started. $Duty_{max}$ is a pulse width of a PPM signal when the motor reaches maximum output. $V_{ref\_max}$ is a maximum output voltage. Because output in an algorithm is a per-element value, $V_{ref\_max}=1$.

At step S3, a control manner of giving a d-axis current 0 is adopted to acquire a d-axis voltage of the motor.

Specifically, three-phase voltages and three-phase currents of the motor are sampled. And an α-axis current and a β-axis current in a two-phase stationary coordinate system may be obtained by performing Clark change on the three-phase currents by means of the following formula (2):

$$\begin{bmatrix} I_\alpha \\ I_\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} I_a \\ I_b \\ I_c \end{bmatrix}. \quad (2)$$

$I_a$, $I_b$ and $I_c$ are the three-phase currents of the motor. And $I_\alpha$ and $I_\beta$ are the α-axis current and the β-axis current in the two-phase stationary coordinate system respectively.

Moreover, an α-axis voltage and a β-axis voltage in the two-phase stationary coordinate system are obtained by performing Clark change on the three-phase voltages by means of the following formula (3):

$$\begin{bmatrix} V_\alpha \\ V_\beta \end{bmatrix} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} V_a \\ V_b \\ V_c \end{bmatrix}. \quad (3)$$

$V_a$, $V_b$ and $V_c$ are the three-phase voltages of the motor. And $V_\alpha$ and $V_\beta$ are the α-axis voltage and the β-axis voltage in the two-phase stationary coordinate system respectively.

A rotor flux angle θ of the motor is calculated by means of a flux observation method (such as model reference adaptation and sliding-mode control), and Park transformation is performed on the α-axis current $I_a$ and the β-axis current $I_b$ in the two-phase stationary coordinate system, so as to obtain a d-axis current and a q-axis current of the motor, as shown in the following formula (4):

$$\begin{bmatrix} I_d \\ I_q \end{bmatrix} = \begin{bmatrix} \cos\theta & \sin\theta \\ -\sin\theta & \cos\theta \end{bmatrix} \begin{bmatrix} I_\alpha \\ I_\beta \end{bmatrix}. \quad (4)$$

$I_d$ and $I_q$ are the d-axis current and the q-axis current of the motor respectively.

In addition, in this embodiment of the present disclosure, the motor is controlled by using a control manner of giving a d-axis current 0. The control manner of giving the d-axis current 0 refers to: setting a giving of the d-axis current as 0 and taking the d-axis current as a given signal of a PI controller. And meanwhile, taking the d-axis current $I_d$ obtained in the formula (4) as a feedback signal of the PI controller; and performing, by the PI controller, closed-loop regulation, such that the d-axis current $I_d$ follows a given current, namely $I_d=0$. Thus, all currents of the motor are used for generating an electromagnetic torque, and the electromagnetic torque is in a linear proportion to an armature current. After the PI controller performs closed-loop regulation, the d-axis voltage of the motor is as shown in the following formula (5):

$$V_d = K_{cp}*[(0-I_d) + K_{cl}\int(0-I_d)dt], V_d \in [-V_{ref\_max}, V_{ref\_max}] \quad (5)$$

$V_d$ is a d-axis voltage of the motor. And $K_{cp}$ and $K_{cl}$ are a proportional gain and an integral gain of the PI controller.

At step S4, a q-axis voltage of the motor at the next moment is calculated according to the first given voltage signal and the d-axis voltage of the motor, and vector control is performed on the motor according to the d-axis voltage of the motor and the q-axis voltage of the motor at the next moment.

Figure 2:
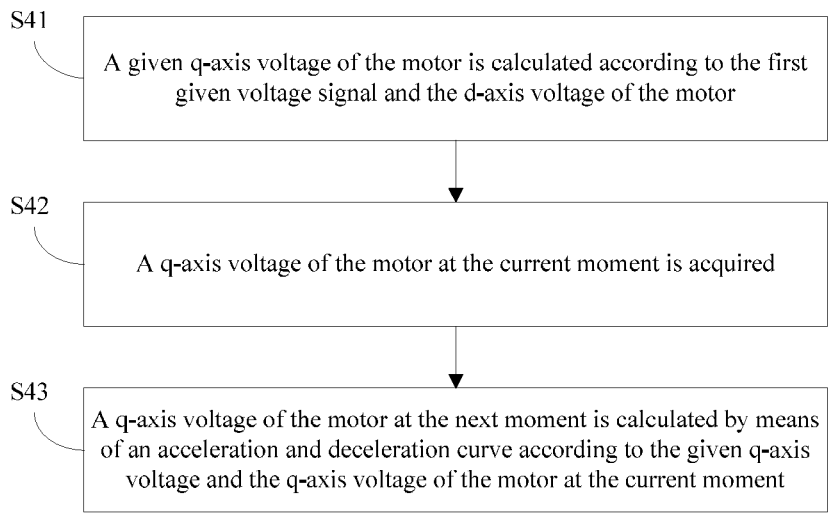
FIG. 2 is a flowchart of calculating a q-axis voltage of a motor according to an embodiment of the present disclosure.

In an embodiment of the present disclosure, as shown in FIG. 2, the operation that a q-axis voltage of the motor at the next moment is calculated according to the first given voltage signal and the d-axis voltage of the motor includes the steps as follows.

At step S41, a given q-axis voltage of the motor is calculated according to the first given voltage signal and the d-axis voltage of the motor.

Specifically, the given q-axis voltage of the motor may be calculated by means of the following formula (6):

$$V_{qref} = \sqrt{V_{ref}^2 - V_d^2} \quad (6);$$

and $V_{qref}$ is a given q-axis voltage of the motor.

At step S42, a q-axis voltage of the motor at the current moment is acquired.

At step S43, a q-axis voltage of the motor at the next moment is calculated by means of an acceleration and deceleration curve according to the given q-axis voltage and the q-axis voltage of the motor at the current moment. The acceleration and deceleration curve may include one of: a linear acceleration and deceleration curve, a variable acceleration curve, a sine curve and the like.

Specifically, when the acceleration and deceleration curve is the linear acceleration and deceleration curve, the q-axis voltage of the motor at the next moment may be calculated by means of the following formula (7):

$$V_{qnew} = \begin{cases} V_{qref}, & |V_{qref} - V_q| \leq m*V_{ref\_max} \\ V_q + m*V_{ref\_max}, & (V_{qref} - V_q) > m*V_{ref\_max} \\ V_q - m*V_{ref\_max}, & (V_q - V_{qref}) > m*V_{ref\_max} \end{cases} \quad (7)$$

$V_{qnew}$ is a q-axis voltage of the motor at the next moment. $V_q$ is a q-axis voltage of the motor at the current moment. And m is a step length size. For example, m may be 0.01.

After the q-axis voltage $V_{qnew}$ of the motor at the next moment is obtained, vector control is performed on the motor according to the q-axis voltage $V_{qnew}$ and the d-axis voltage $V_d$.

According to the motor vector control method in the embodiment of the present disclosure, a direct voltage giving manner is adopted to perform maximum torque control on a motor, thereby achieving change of an output voltage of the motor along with a pulse width of a PPM signal. Thus, a highest rotating speed also changes along with a battery voltage, and an offset between giving and feedback is not caused by taking voltage as a control quantity. Moreover, torque pulsation caused by traditional square wave control may be reduced in a manner of outputting a sine wave current, thereby effectively reducing vibration and noise of a propeller of an aircraft. When an attitude is stabilized, pulse width change will be converted to voltage change, the rotating speed will not rapidly change, and therefore the problem of stability jitter of an aircraft caused by too-rapid giving due to a speed closed-loop control manner is effectively solved.

Further, in an optional embodiment of the present disclosure, after the q-axis voltage of the motor at the next moment is calculated, the method further includes the steps as follows. A q-axis current of the motor is acquired. PI regulation and amplitude limitation are performed on the q-axis current of the motor. And the q-axis voltage of the motor at the next moment is regulated and amplitude-limited according to the amplitude-limited q-axis current.

That is to say, after the q-axis voltage of the motor at the next moment is calculated, the finally-output q-axis voltage of the motor at the next moment is also adjusted and amplitude-limited according to an amplitude limiting result of the q-axis current of the motor.

In an optional embodiment of the present disclosure, the q-axis voltage of the motor at the next moment may be regulated and amplitude-limited by means of the following formula (8):

$$V_{qz} = V_{qnew} - (V_{qlim\ Max} + V_{qlim\ Min}), V_{qz} \in [-\sqrt{V_{refmax}^2 - V_d^2}, \sqrt{V_{refmax}^2 - V_d^2}] \quad (8).$$

$V_{qz}$ is an amplitude-limited q-axis voltage of the motor at the next moment. $V_{qlim\ Max}$ is an amplitude-limited q-axis negative amplitude limiting voltage, and $V_{qlim\ Min}$ is an amplitude-limited q-axis positive amplitude limiting voltage.

In the above-mentioned formula, the amplitude-limited q-axis negative amplitude limiting voltage $V_{qlim\ Max}$ and the amplitude-limited q-axis positive amplitude limiting voltage $V_{qlim\ Min}$ may be calculated by means of the following formula (9). That is, the PI regulation and the amplitude limitation may be performed on the q-axis current of the motor by means of the following formula (9):

$$V_{qlim\ Max} = K_p * [(I_{qmax} - I_q) + K_I \int (I_{qmax} - I_q) dt],$$
$$V_{qlim\ Max} \in [-\sqrt{V_{refmax}^2 - V_d^2}, 0]$$

$$V_{qlim\ Min} = K_p * [(I_{qmin} - I_q) + K_I \int (I_{qmin} - I_q) dt], V_{qlim\ Min} \in [0, \sqrt{V_{refmax}^2 - V_d^2}] \quad (9).$$

$K_p$ and $K_I$ are a proportional gain and an integral gain of PI regulation respectively, $I_{qmax}$ is a maximum q-axis current of the motor and $I_{qmax} > 0$. And $I_{qmin}$ is a minimum q-axis current of the motor and $I_{qmin} < 0$.

A specific current limiting process is as follows. When $I_q > I_{qmax}$, a negative amplitude limiting voltage $V_{qlim\ Max}$ will be obtained by means of the PI controller. And then the negative value is superposed to the output q-axis voltage $V_{qnew}$ of the motor at the next moment, so that the output q-axis voltage $V_q$ is reduced. After the q-axis voltage $V_q$ is reduced, the q-axis current $I_q$ will be correspondingly reduced, so as to form a negative feedback closed-loop system. Negative feedback closed-loop control enables a maximum forward current of the system not to exceed the maximum q-axis current $I_{qmax}$. Meanwhile, acceleration with a set maximum current in an acceleration process may be realized, thereby increasing the response speed of the motor.

When $I_{qmin} < I_q < I_{qmax}$, $V_{qlim\ Max}$ and $V_{qlim\ Min}$ will be set as 0 after the amplitude limitation, so as to achieve change of the q-axis voltage $V_q$ along with the given q-axis voltage $V_{qref}$.

When $I_q < I_{qmin}$, a positive amplitude limiting voltage $V_{qlim\ Min}$ will be obtained by means of the PI controller, and this value is superposed to the output q-axis voltage $V_{qnew}$ of the motor at the next moment, so that the output q-axis voltage $V_q$ is increased. After the q-axis voltage $V_q$ is increased, the q-axis current $I_q$ will be correspondingly increased, so as to form a negative feedback closed-loop system, thereby achieving a current amplitude limiting effect.

Finally, a power switching tube is driven by an output signal converted to six paths of PWM signals in a Space Vector Pulse Width Modulation (SVPWM) manner according to the q-axis voltage $V_{qz}$ of the motor at the next moment obtained in the formula (8) and the d-axis voltage $V_d$ obtained in the formula (5).

Therefore, the motor vector control method in above-mentioned embodiments of the present disclosure accelerates and decelerates running of a motor with a maximum torque by controlling forward and reverse maximum currents, thereby increasing the response speed of a system.

To sum up, according to the motor vector control method in the embodiments of the present disclosure, the PPM signal is received, and the first given voltage signal of the motor is acquired according to the PPM signal. Then, the control manner of giving the d-axis current 0 is adopted, so as to acquire the d-axis voltage of the motor, and the q-axis voltage of the motor at the next moment is calculated according to the first given voltage signal and the d-axis voltage of the motor. And finally, vector control is performed on the motor according to the d-axis voltage of the motor and the q-axis voltage of the motor at the next moment. The method adopts a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved. In addition, running of the motor is accelerated and decelerated with a maximum torque by controlling forward and reverse maximum currents, thereby increasing the response speed of a system.

Figure 3:
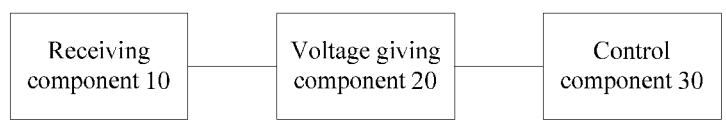
FIG. 3 is a block schematic diagram of a motor vector control device according to an embodiment of the present disclosure.

FIG. 3 is a block schematic diagram of a motor vector control device according to an embodiment of the present disclosure. According to an embodiment as shown in FIG. 3, the motor vector control device includes: a receiving component 10, a voltage giving component 20 and a control component 30.

Specifically, the receiving component 10 is arranged to receive a PPM signal.

For example, in application of an aircraft, the PPM signal may be output from a flight controller to an electronic speed regulator. And the receiving component 10 in the electronic speed regulator receives the PPM signal and then controls a motor according to the received PPM signal.

In an exemplary embodiment of the present disclosure, the PPM signal is a periodic PWM signal of which a positive pulse width is in a range of 1 to 2 ms and the frequency may be in a range of 50 to 400 Hz. It should be noted that in another exemplary of the present disclosure, the PPM signal may also be given in a manner such as analog voltage or serial port communication.

The voltage giving component 20 is connected with the receiving component 10, and arranged to acquire a first given voltage signal of a motor according to the PPM signal.

In an optional embodiment of the present disclosure, when the voltage giving component 20 is arranged to acquire the first given voltage signal of the motor according to the PPM signal by the following steps: acquiring a pulse width of the PPM signal, and acquiring the first given voltage signal according to the pulse width of the PPM signal. Specifically, the first given voltage signal $V_{ref}$ may be acquired by means of the above formula (1).

The control component 30 is connected with the voltage giving component 20, and arranged to adopt a control manner of giving a d-axis current 0 to acquire a d-axis voltage of the motor, calculate a q-axis voltage of the motor at the next moment according to the first given voltage signal and the d-axis voltage of the motor, and perform vector control on the motor according to the d-axis voltage of the motor and the q-axis voltage of the motor at the next moment.

Figure 4:
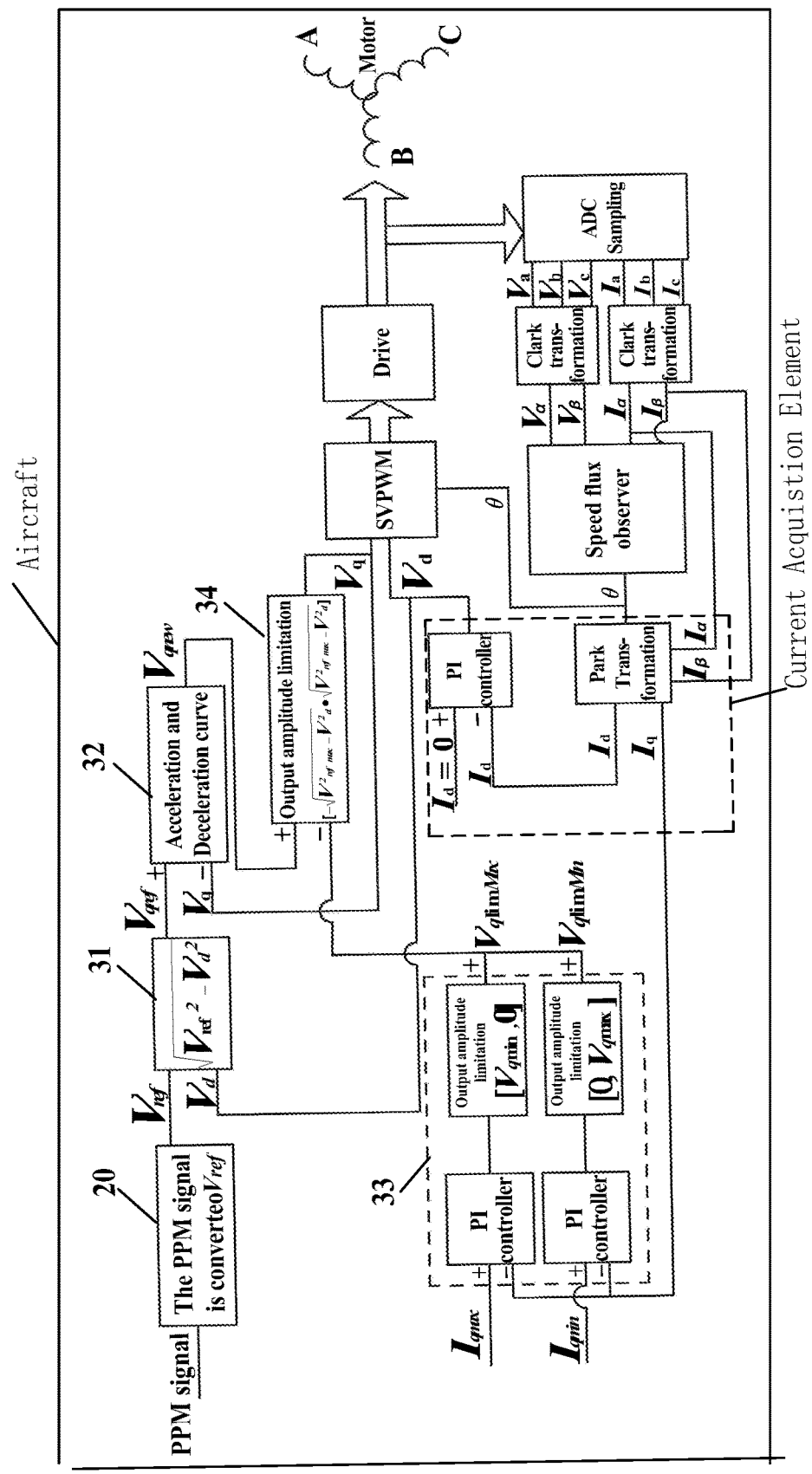
FIG. 4 is a block schematic diagram of a motor control system according to an embodiment of the present disclosure.

Specifically, according to an embodiment as shown in FIG. 4, when acquiring the d-axis voltage of the motor, the control component 30 may sample three-phase voltages $V_a$, $V_b$ and $V_c$ and three-phase currents $I_a$, $I_b$ and $I_c$ of the motor. And then the control component 30 may perform Clark change on the three-phase currents $I_a$, $I_b$ and $I_c$ by means of the above formula (2) so as to obtain an α-axis current $I_\alpha$ and a β-axis current $I_\beta$ in a two-phase stationary coordinate system. After that the control component 30 may perform Clark change on the three-phase voltages $V_a$, $V_b$ and $V_c$ by means of the above formula (3) so as to obtain an α-axis voltage $V_\alpha$ and a β-axis voltage $V_\beta$ in the two-phase stationary coordinate system. Then, a rotor flux angle θ of the motor is calculated by means of a flux observation method (such as model reference adaptation and sliding-mode control), and Park transformation is performed on the α-axis current $I_a$ and the β-axis current $I_b$ in the two-phase stationary coordinate system, so as to obtain a d-axis current $I_d$ and a q-axis current $I_q$ of the motor, as shown in the above formula (4).

In addition, in an optional embodiment of the present disclosure, the control component 30 controls the motor by using a control manner of giving a d-axis current 0 ($I^*_d$=0). The control manner of giving a d-axis current 0 refers to: setting a giving of the d-axis current as 0, and taking the d-axis current as a given signal of a PI controller. And meanwhile, taking the d-axis current $I_d$ obtained in the above formula (4) as a feedback signal of the PI controller; and performing, by the PI controller, closed-loop regulation, such that the d-axis current $I_d$ follows a given current, namely $I_d$=0. Thus, all currents of the motor are used for generating an electromagnetic torque, and the electromagnetic torque is in a linear proportion to an armature current. After the PI controller performs closed-loop regulation, the d-axis voltage $V_d$ of the motor is as shown in the above formula (5).

Then, the control component 30 calculates a q-axis voltage of the motor at the next moment according to the first given voltage signal $V_{ref}$ and the d-axis voltage $V_d$ of the motor.

In an optional embodiment of the present disclosure, as shown in FIG. 4, the control component 30 includes: a first calculation element 31 and a second calculation element 32. The first calculation element 31 is arranged to calculate a given q-axis voltage of the motor according to the first given voltage signal and the d-axis voltage of the motor. And the second calculation element 32 is connected with the first calculation element 31, and arranged to acquire a q-axis voltage of the motor at the current moment, and calculate a q-axis voltage of the motor at the next moment by means of an acceleration and deceleration curve according to the given q-axis voltage and the q-axis voltage of the motor at the current moment.

Specifically, the first calculation element 31 may calculate the given q-axis voltage $V_{ref}$ of the motor by means of the above formula (6). The acceleration and deceleration curve may include one of: a linear acceleration and deceleration curve, a variable acceleration curve, a sine curve and the like. When the acceleration and deceleration curve is the linear acceleration and deceleration curve, the second calculation element 32 may calculate a q-axis voltage $V_{qnew}$ of the motor at the next moment by means of the above formula (7).

After the q-axis voltage $V_{qnew}$ of the motor at the next moment is obtained, the control component 30 performs vector control on the motor according to the q-axis voltage $V_{qnew}$ and the d-axis voltage $V_d$.

According to the motor vector control device in above-mentioned embodiments of the present disclosure, a direct voltage giving manner is adopted to perform maximum torque control on a motor, thereby achieving change of an output voltage of the motor along with a pulse width of a PPM signal. Thus, a highest rotating speed also changes along with a battery voltage, and an offset between giving and feedback is not caused by taking voltage as a control quantity. Moreover, torque pulsation caused by traditional square wave control may be reduced in a manner of outputting a sine wave current, thereby effectively reducing vibration and noise of a propeller of an aircraft. When an attitude is stabilized, pulse width change will be converted to voltage change, the rotating speed will not rapidly change, and therefore the problem of stability jitter of an aircraft caused by too-rapid giving due to a speed closed-loop control manner is effectively solved.

Further, in an optional embodiment of the present disclosure, as shown in FIG. 4, the control component 30 further includes: a current acquisition element, a first processing element 33 and a second processing element 34. The current acquisition element is arranged to acquire a q-axis current of the motor. The first processing element 33 is connected with the current acquisition element, and arranged to perform PI regulation and amplitude limitation on the q-axis current of the motor. And the second processing element 34 is connected with the first processing element 33, and arranged to perform regulation and amplitude limitation on the q-axis voltage of the motor at the next moment according to the amplitude-limited q-axis current.

That is to say, after the second calculation element 32 calculates the q-axis voltage $V_{qnew}$ of the motor at the next moment, the second processing element 34 further performs adjustment and amplitude limitation on the finally-output q-axis voltage of the motor at the next moment according to an amplitude limiting result of the q-axis current of the motor. Specifically, the second processing element 34 may perform regulation and amplitude limitation on the q-axis voltage $V_{qnew}$ of the motor at the next moment by means of the above formula (8). The amplitude-limited q-axis negative amplitude limiting voltage $V_{qlim\ Max}$ and the amplitude-limited q-axis positive amplitude limiting voltage $V_{qlim\ Min}$ may be calculated by means of the above formula (9). That is, the first processing element 33 may perform PI regulation and amplitude limitation on the q-axis current of the motor by means of the above formula (9).

A specific current limiting process is as follows. When $I_q > I_{qmax}$, a negative amplitude limiting voltage $V_{qlim\ Max}$ will be obtained by means of the PI controller. And then the negative value is superposed to the output q-axis voltage $V_{qnew}$ of the motor at the next moment, so that the output q-axis voltage $V_q$ is reduced. After the q-axis voltage $V_q$ is reduced, the q-axis current $I_q$ will be correspondingly reduced, so as to form a negative feedback closed-loop system. Negative feedback closed-loop control enables a maximum forward current of the system not to exceed the maximum q-axis current $I_{qmax}$. Meanwhile, acceleration with a set maximum current in an acceleration process may be realized, thereby increasing the response speed of the motor.

When $I_{qmin} < I_q < I_{qmax}$, $V_{qlim\ Max}$ and $V_{qlim\ Min}$ will be set as 0 after amplitude limitation, so as to achieve change of the q-axis voltage $V_q$ along with the given q-axis voltage $V_{qref}$.

When $I_q < I_{qmin}$, a positive amplitude limiting voltage $V_{qlim\ Min}$ will be obtained by means of the PI controller, and this value is superposed to the output q-axis voltage $V_{qnew}$ of the motor at the next moment, so that the output q-axis voltage $V_q$ is increased. After the q-axis voltage $V_q$ is increased, the q-axis current $I_q$ will be correspondingly increased, so as to form a negative feedback closed-loop system, thereby achieving a current amplitude limiting effect.

Finally, the control component 30 drives a power switching tube by an output signal converted to six paths of PWM signals in an SVPWM manner according to the q-axis voltage $V_{qz}$ of the motor at the next moment obtained in the above formula (8) and the d-axis voltage $V_d$ obtained in the above formula (5).

Therefore, the motor vector control device in above-mentioned embodiments of the present disclosure accelerates and decelerates running of a motor with a maximum torque by controlling forward and reverse maximum currents, thereby increasing the response speed of a system.

According to the motor vector control device in the embodiments of the present disclosure, the receiving component receives the PPM signal, the voltage giving component acquires the first given voltage signal of the motor according to the PPM signal, and the control component adopts the control manner of giving the d-axis current 0 to acquire a d-axis voltage of the motor, calculates the q-axis voltage of the motor at the next moment according to the first given voltage signal and the d-axis voltage of the motor, and performs vector control on the motor according to the d-axis voltage of the motor and the q-axis voltage of the motor at the next moment. The device adopts a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved.

In addition, running of the motor is accelerated and decelerated with a maximum torque by controlling forward and reverse maximum currents, thereby increasing the response speed of a system.

Besides, another embodiment of the present disclosure also provides an aircraft, including the above-mentioned motor vector control device.

In an embodiment of the present disclosure, a storage medium is also provided. The storage medium includes a stored program. When the program is run, a device where the storage medium is located is controlled to execute the above-mentioned motor vector control method.

The storage medium is arranged to store a program for executing the following functions: receiving a PPM signal; acquiring a first given voltage signal of a motor according to the PPM signal; adopting a control manner of giving a d-axis current 0 to acquire a d-axis voltage of the motor; and calculating a q-axis voltage of the motor at the next moment according to the first given voltage signal and the d-axis voltage of the motor, and performing vector control on the motor according to the d-axis voltage of the motor and the q-axis voltage of the motor at the next moment.

Alternatively, the storage medium is further arranged to store a program for executing the following functions: acquiring a pulse width of the PPM signal; and acquiring the first given voltage signal according to the pulse width of the PPM signal.

Alternatively, the storage medium is further arranged to store a program for executing the following functions: calculating a given q-axis voltage of the motor according to the first given voltage signal and the d-axis voltage of the motor; acquiring a q-axis voltage of the motor at the current moment; and calculating a q-axis voltage of the motor at the next moment by means of an acceleration and deceleration curve according to the given q-axis voltage and the q-axis voltage of the motor at the current moment.

In an embodiment of the present disclosure, a processor is also provided. The processor is arranged to run a program. When the program is run, the above-mentioned motor vector control method is executed.

The processor is arranged to store a program for executing the following functions: receiving a PPM signal; acquiring a first given voltage signal of a motor according to the PPM signal; adopting a control manner of giving a d-axis current 0, so as to acquire a d-axis voltage of the motor; and calculating a q-axis voltage of the motor at the next moment according to the first given voltage signal and the d-axis voltage of the motor, and performing vector control on the motor according to the d-axis voltage of the motor and the q-axis voltage of the motor at the next moment.

Alternatively, the processor is further arranged to store a program for executing the following functions: acquiring a pulse width of the PPM signal; and acquiring the first given voltage signal according to the pulse width of the PPM signal.

Alternatively, the processor is further arranged to store a program for executing the following functions: calculating a given q-axis voltage of the motor according to the first given voltage signal and the d-axis voltage of the motor; acquiring a q-axis voltage of the motor at the current moment; and calculating a q-axis voltage of the motor at the next moment by means of an acceleration and deceleration curve according to the given q-axis voltage and the q-axis voltage of the motor at the current moment.

The aircraft in one embodiment of the present disclosure adopts, by means of the above-mentioned motor vector control device, a direct voltage giving manner to perform maximum torque control on a motor, so that not only torque pulsation generated by square wave control can be reduced to reduce vibration and noise, but also the problems of loss of control and strong jitter of a machine body caused by speed closed-loop control are solved, thereby improving the overall performance of the aircraft.

In the descriptions of the present disclosure, it will be appreciated that terms "first" and "second" are used for description and cannot be interpreted as indicating or impliedly indicating a relative importance or impliedly indicating the quantity of indicated technical features. Thus, limited features "first" and "second" may explicitly indicate or impliedly include one or more of these features. In the descriptions of the present disclosure, "multiple" means two or more than two, such as two or three, unless specified otherwise.

In the present disclosure, unless otherwise specified and limited, terms "installation", "mutual connection", "connection" and "fixing" should be generally understood. For example, the connection may be fixed connection, or may be detachable connection, or may be integrated. The connection may be mechanical connection, or may be electrical connection. The connection may be direct connection, or may be indirect connection via an intermediate, or may be internal communication between two elements or interaction between two elements, unless specified otherwise. A person of ordinary skill in the art may understand specific meanings of the above terms in the present disclosure according to specific situations.

In the descriptions of the present specification, descriptions referring to terms "one embodiment", "some embodiments", "example", "specific example" or "some examples" are intended to be included in at least one embodiment or example of the present disclosure in conjunction with specific features, structures, materials or characteristics described in this embodiment or example. In the present specification, schematic expressions to the above terms may not refer to the same embodiment or example. Moreover, the described specific features, structures, materials or characteristics may be combined in any one or more embodiments or examples in a suitable manner. Besides, a person skilled in the art may combine and assemble different embodiments or examples described in the present specification and features of different embodiments or examples without mutual conflicts.

Although the embodiments of the present disclosure have been shown and described above, it will be appreciated that the above-mentioned embodiments are exemplary and cannot be interpreted as limitations to the present disclosure. A person of ordinary skill in the art may change, modify, replace and transform the above-mentioned embodiments within the scope of the present disclosure.

What is claimed is:

1. A motor vector control method, comprising:
receiving a Pulse Position Modulation (PPM) signal;
acquiring a first given voltage signal of a motor according to the PPM signal;
adopting a control manner of giving a d-axis current 0 to acquire a d-axis voltage of the motor; and
calculating a q-axis voltage of the motor at the next moment according to the first given voltage signal and the d-axis voltage of the motor, and performing vector control on the motor according to the d-axis voltage of the motor and the q-axis voltage of the motor at the next moment;
wherein acquiring the first given voltage signal of the motor according to the PPM signal comprises:
acquiring a pulse width of the PPM signal; and
acquiring the first given voltage signal according to the pulse width of the PPM signal;
wherein adopting a control manner of giving a d-axis current 0 to acquire a d-axis voltage of the motor comprises:
setting a giving of the d-axis current as 0 and taking the d-axis current as a given signal of a PI controller; after the PI controller performs closed-loop regulation, the d-axis voltage of the motor is as shown in the following formula:

$$V_d = K_{cp} * [(0-I_d) + K_{cl} \int (0-I_d) dt], V_d \in [-V_{ref\,max}, V_{ref\,max}]$$

$V_d$ is a d-axis voltage of the motor, and $K_{cp}$ and $K_{cl}$ are a proportional gain and an integral gain of the PI controller;
wherein calculating the q-axis voltage of the motor at the next moment according to the first given voltage signal and the d-axis voltage of the motor comprises:
calculating a given q-axis voltage of the motor according to the first given voltage signal and the d-axis voltage of the motor;
acquiring a q-axis voltage of the motor at the current moment; and
calculating the q-axis voltage of the motor at the next moment by means of an acceleration and deceleration curve according to the given q-axis voltage and the q-axis voltage of the motor at the current moment.

2. The method as claimed in claim 1, wherein the first given voltage signal is acquired by means of the following formula:

$$V_{ref} = \frac{Duty_{on} - Duty_{start}}{Duty_{max} - Duty_{start}} * V_{ref\,max},$$

$$V_{ref} \in [0, V_{ref\,max}],$$

wherein $V_{ref}$ is the first given voltage signal, $Duty_{on}$ is a pulse width of a current PPM signal, $Duty_{start}$ is a pulse width of a PPM signal when the motor is started, $Duty_{max}$ is a pulse width of a PPM signal when the motor reaches maximum output, and $V_{ref\,max}$ is a maximum output voltage.

3. The method as claimed in claim 1, wherein the given q-axis voltage of the motor is calculated by means of the following formula:

$$V_{qref} = \sqrt{V_{ref}^2 - V_d^2},$$

wherein $V_{qref}$ is the given q-axis voltage of the motor, $V_{ref}$ is the first given voltage signal, and $V_d$ is the d-axis voltage of the motor.

4. The method as claimed in claim 1, wherein the acceleration and deceleration curve comprises one of: a linear acceleration and deceleration curve, a variable acceleration curve and a sine curve.

5. The method as claimed in claim 4, wherein when the acceleration and deceleration curve is the linear acceleration and deceleration curve, the q-axis voltage of the motor at the next moment is calculated by means of the following formula:

$$V_{qnew} = \begin{cases} V_{qref}, & |V_{qref} - V_q| \le m * V_{ref\,max} \\ V_q + m * V_{ref\,max}, & (V_{qref} - V_q) > m * V_{ref\,max} \\ V_q - m * V_{ref\,max}, & (V_q - V_{qref}) > m * V_{ref\,max} \end{cases}$$

wherein $V_{qnew}$ is the q-axis voltage of the motor at the next moment, $V_{qref}$ is the given q-axis voltage of the motor, is the q-axis voltage of the motor at the current moment, $V_q$ and m is a step length size.

6. The method as claimed in claim 1, wherein after the q-axis voltage of the motor at the next moment is calculated, the method further comprises:

acquiring a q-axis current of the motor;

performing Proportional Integral (PI) regulation and amplitude limitation on the q-axis current of the motor; and performing regulation and amplitude limitation on the q-axis voltage of the motor at the next moment according to the amplitude-limited q-axis current.

7. The method as claimed in claim 6, wherein the PI regulation and the amplitude limitation are performed on the q-axis current of the motor by means of the following formula:

$$V_{qlim\ Max} = K_p*[(I_{qmax}-I_q)+K_I\!\int(I_{qmax}-I_q)dt],$$
$$V_{qlim\ Max} \in [-\sqrt{V_{refmax}^2 - V_d^2}, 0]$$

$$V_{qlim\ Min} = K_p*[(I_{qmin}-I_q)+K_I\!\int(I_{qmin}-I_q)dt], V_{qlim\ Min} \in [0, \sqrt{V_{refmax}^2 - V_d^2}],$$

wherein $V_{qlim\ Max}$ an amplitude-limited q-axis negative amplitude limiting voltage, $V_{qlim\ Min}$ is an amplitude-limited q-axis positive amplitude limiting voltage, $K_p$ and $K_I$ are a proportional gain and an integral gain of PI regulation respectively, $I_{qmax}$ is a maximum q-axis current of the motor, $I_{qmin}$ is a minimum q-axis current of the motor, $I_q$ is the q-axis current of the motor, $V_{ref\ max}$ is a maximum output voltage, and $V_d$ is the d-axis voltage of the motor.

8. The method as claimed in claim 6, wherein the q-axis voltage of the motor at the next moment is regulated and amplitude-limited by means of the following formula:

$$V_{qz} = V_{qnew} - (V_{qlim\ Max} + V_{qlim\ Min}), V_{qz} \in [-\sqrt{V_{refmax}^2 - V_d^2}, \sqrt{V_{refmax}^2 - V_d^2}],$$

wherein $V_{qz}$ is an amplitude-limited q-axis voltage of the motor at the next moment, $V_{qnew}$ is the q-axis voltage of the motor at the next moment, $V_{qlim\ Max}$ is an amplitude-limited q-axis negative amplitude limiting voltage, $V_{qlim\ Min}$ is an amplitude-limited q-axis positive amplitude limiting voltage, $V_{ref Max}$ is a maximum output voltage, and $V_d$ is the d-axis voltage of the motor.

9. A motor vector control device, comprising:

a receiving component, arranged to receive a Pulse Position Modulation (PPM) signal;

a voltage giving component, connected with the receiving component, and arranged to acquire a first given voltage signal of a motor according to the PPM signal; and a control component, connected with the voltage giving component, and arranged to adopt a control manner of giving a d-axis current 0 to acquire a d-axis voltage of the motor, calculate a q-axis voltage of the motor at the next moment according to the first given voltage signal and the d-axis voltage of the motor, and perform vector control on the motor according to the d-axis voltage of the motor and the q-axis voltage of the motor at the next moment;

wherein the voltage giving component is arranged to acquire the first given voltage signal of the motor according to the PPM signal by the following steps: acquiring a pulse width of the PPM signal, and acquiring the first given voltage signal according to the pulse width of the PPM signal;

wherein the control component also arranged to set a giving of the d-axis current as 0 and taking the d-axis current as a given signal of a PI controller; after the PI controller performs closed-loop regulation, the d-axis voltage of the motor is as shown in the following formula:

$$V_d = K_{cp}*[(0-I_d)+K_{cl}\!\int(0-I_d)dt], V_d \in [-V_{ref\ max}, V_{ref\ max}]$$

$V_d$ is a d-axis voltage of the motor, $K_{cp}$ and $K_{cl}$ are a proportional gain and an integral gain of the PI controller;

wherein the control component comprises:

a first calculation element, arranged to calculate the given q-axis voltage of the motor according to the first given voltage signal and the d-axis voltage of the motor; and a second calculation element, connected with the first calculation element, and arranged to acquire a q-axis voltage of the motor at the current moment, and calculate the q-axis voltage of the motor at the next moment by means of an acceleration and deceleration curve according to the given q-axis voltage and the q-axis voltage of the motor at the current moment.

10. The device as claimed in claim 9, wherein the voltage giving component is arranged to acquire the first given voltage signal by means of the following formula:

$$V_{ref} = \frac{Duty_{on} - Duty_{start}}{Duty_{max} - Duty_{start}} * V_{ref\ max},$$

$$V_{ref} \in [0, V_{ref\ max}],$$

wherein $V_{ref}$ is the first given voltage signal, $Duty_{on}$ is a pulse width of a current PPM signal, $Duty_{start}$ is a pulse width of a PPM signal when the motor is started, $Duty_{max}$ is a pulse width of a PPM signal when the motor reaches maximum output, $V_{ref\ max}$ is a maximum output voltage.

11. The device as claimed in claim 9, wherein the first calculation element is arranged to calculate the given q-axis voltage of the motor by means of the following formula:

$$V_{qref} = \sqrt{V_{ref}^2 - V_d^2},$$

wherein $V_{qref}$ is the given q-axis voltage of the motor, $V_{ref}$ is the first given voltage signal, and $V_d$ is the d-axis voltage of the motor.

12. The device as claimed in claim 9, wherein the acceleration and deceleration curve comprises one of: a linear acceleration and deceleration curve, a variable acceleration curve and a sine curve.

13. The device as claimed in claim 12, wherein when the acceleration and deceleration curve is the linear acceleration and deceleration curve, the q-axis voltage of the motor at the next moment is calculated by means of the following formula:

$$V_{qnew} = \begin{cases} V_{qref}, & |V_{qref} - V_q| \le m*V_{ref\ max} \\ V_q + m*V_{ref\ max}, & (V_{qref} - V_q) > m*V_{ref\ max} \\ V_q - m*V_{ref\ max}, & (V_q - V_{qref}) > m*V_{ref\ max} \end{cases}$$

wherein $V_{qnew}$ is the q-axis voltage of the motor at the next moment, $V_{qref}$ is the given q-axis voltage of the motor, is the q-axis voltage of the motor at the current moment, and m is a step length size.

14. The device as claimed in claim 9, wherein the control component further comprises:

a current acquisition element, arranged to acquire a q-axis current of the motor;

a first processing element, connected with the current acquisition element, and arranged to perform Proportional Integral (PI) regulation and amplitude limitation on the q-axis current of the motor; and a second processing element, connected with the first processing element, and arranged to perform regulation and amplitude limitation on the q-axis voltage of the motor at the next moment according to the amplitude-limited q-axis current.

15. The device as claimed in claim 14, wherein the first processing element is arranged to perform the PI regulation and the amplitude limitation on the q-axis current of the motor by means of the following formula:

$$V_{qlim\ Max} = K_p * [(I_{qmax} - I_q) + K_I \int (I_{qmax} - I_q) dt], V_{qlim\ Max} \in [-\sqrt{V_{refmax}^2 - V_d^2}, 0]$$

$$V_{qlim\ Min} = K_p * [(I_{qmin} - I_q) + K_I \int (I_{qmin} - I_q) dt], V_{qlim\ Min} \in [0, \sqrt{V_{refmax}^2 - V_d^2}]$$

wherein $V_{qlim\ Max}$ is an amplitude-limited q-axis negative amplitude limiting voltage, $V_{qlim\ Min}$ is an amplitude-limited q-axis positive amplitude limiting voltage, $K_p$ and $K_I$ are a proportional gain and an integral gain of PI regulation respectively, $I_{qmax}$ is a maximum q-axis current of the motor, $I_{qmin}$ is a minimum q-axis current of the motor, $I_q$ is the q-axis current of the motor, is a maximum output voltage, and $V_d$ is the d-axis voltage of the motor;

or wherein the second processing element is arranged to perform regulation and amplitude limitation on the q-axis voltage of the motor at the next moment by means of the following formula:

$$V_{qz} = V_{qnew} - (V_{qlim\ Max} + V_{qlim\ Min}), V_{qz} \in [-\sqrt{V_{refmax}^2 - V_d^2}, \sqrt{V_{refmax}^2 - V_d^2}],$$

wherein $V_{qz}$ is an amplitude-limited q-axis voltage of the motor at the next moment, $V_{qnew}$ is the q-axis voltage of the motor at the next moment, $V_{qlim\ Max}$ is an amplitude-limited q-axis negative amplitude limiting voltage, $V_{qlim\ Min}$ is an amplitude-limited q-axis positive amplitude limiting voltage, $V_{ref\ max}$ is a maximum output voltage, and $V_d$ is the d-axis voltage of the motor.

16. An aircraft, comprising the motor vector control device as claimed in claim 9.

* * * * *